(12) United States Patent
Leizerson et al.

(10) Patent No.: US 11,609,092 B2
(45) Date of Patent: Mar. 21, 2023

(54) SYSTEM AND METHOD FOR DETERMINING REAL-WORLD GEOGRAPHIC LOCATIONS OF MULTIPLE MEMBERS

(71) Applicant: Elbit Systems Land and C4I Ltd., Netanya (IL)

(72) Inventors: Ilya Leizerson, Netanya (IL); Ezra Zamir, Netanya (IL); Gavriel Davidov, Netanya (IL); Tal Fromm, Netanya (IL); Arie Vainstein, Netanya (IL); Naphtaly Voichek, Netanya (IL); Amitay Berger, Netanya (IL)

(73) Assignee: Elbit Systems Land and C4I Ltd., Netanya (IL)

( * ) Notice: Subject to any disclaimer, the term of this patent is extended or adjusted under 35 U.S.C. 154(b) by 270 days.

(21) Appl. No.: 17/138,965

(22) Filed: Dec. 31, 2020

(65) Prior Publication Data

US 2021/0123739 A1     Apr. 29, 2021

Related U.S. Application Data

(63) Continuation of application No. PCT/IL2019/050739, filed on Jul. 3, 2019.

(30) Foreign Application Priority Data

Jul. 3, 2018    (IL) .......................................... 260406

(51) Int. Cl.
     *G01S 19/47*      (2010.01)
     *G01S 19/51*      (2010.01)
     *G01C 21/16*     (2006.01)

(52) U.S. Cl.
     CPC .......... *G01C 21/1654* (2020.08); *G01S 19/47* (2013.01); *G01S 19/51* (2013.01)

(58) Field of Classification Search
     CPC ...... G01C 21/1654; G01S 19/47; G01S 19/51
     See application file for complete search history.

(56) References Cited

U.S. PATENT DOCUMENTS 6,741,209 B2    5/2004   Lee
2012/0052884 A1   3/2012   Bogatin
                  (Continued)

FOREIGN PATENT DOCUMENTS

KR        10-1629691      6/2016

OTHER PUBLICATIONS

Office Action for Israel Patent Application No. 260406, dated Feb. 16, 2020.
(Continued)

*Primary Examiner* — Mathew Franklin Gordon
(74) *Attorney, Agent, or Firm* — Pearl Cohen Zedek Latzer Baratz LLP

(57) ABSTRACT

Methods and systems for determining real-world geographic locations of multiple interconnected members are provided herein. The method may include: determining distances between at least some members of a first subgroup of the multiple members; determining movement vectors of members of a second subgroup of the multiple members; determining real-world geographic locations of members of a third subgroup of the multiple members; and determining, based on the distances between the at least some members of the first subgroup, the movement vectors of the members of the second subgroup and the real-world geographic locations of the members of the third group, the real-world geographic locations of the multiple members.

20 Claims, 10 Drawing Sheets

(56) References Cited

U.S. PATENT DOCUMENTS

| | | |
|---|---|---|
| 2012/0238298 A1 | 9/2012 | Sip |
| 2013/0045759 A1 | 2/2013 | Smith |
| 2013/0331130 A1 | 12/2013 | Lee |
| 2014/0323162 A1 | 10/2014 | Ezra et al. |
| 2016/0066157 A1 | 3/2016 | Noorshams et al. |

OTHER PUBLICATIONS

Israel Search Report (IPO) dated Apr. 7, 2019.
Supplementary European Search Report dated Jul. 1, 2021.
Safavi Sam et al: "An Opportunistic Linear-Convex Algorithm for Localization in Mobile Robot Networks" IEEE Transactions on Robotics; Aug. 1, 2017.
Pires Anderson Grandi et al: Exploring heterogeneity for cooperative localization in Swarm Robotics; 2015 International Conference on Advanced Robotics (ICAR), IEEE Jul. 27, 2015.
Wanasinghe Thumeera R et al: "Decentralized Cooperative Localization for Heterogeneous Multi-Robot System using Split Covariance Intersection Filter", 2014 Canadian Conference on Computer and Robot Vision, IEEE May 6, 2014.
Leung Keith et al: Cooperatrive Loacalization and Mapping in Sparsely-communicating Robot Networks Jun. 1, 2012; Retrieved from the internet: URL: http://asrl.utias.utoronto.ca/~tdb/bit/leung_phd12.pdf.
Jouni Rantakokko et al: Accurate and reliable soldier and first responder indoor positioning: multisensory systems and cooperative localization, IEEE Wireless Communications, coordinated science laboratory; Dept. Electrical and computer engineering; University of Illinois at Urbana-Champaign, US, vol. 18, No. 2, Apr. 1, 2011.
Dorota Grejner-Brzezinska et al: "Sensor Integration for Personal Navigation Electronic Notes available for Download", IEEE/ION Plans 2014 May 5, 2014.
International Search Report for PCT Application No. PCT/IL2019/050739, dated Oct. 23, 2019.
Office Action for Israel Patent Application No. 260406, dated Apr. 16, 2019.

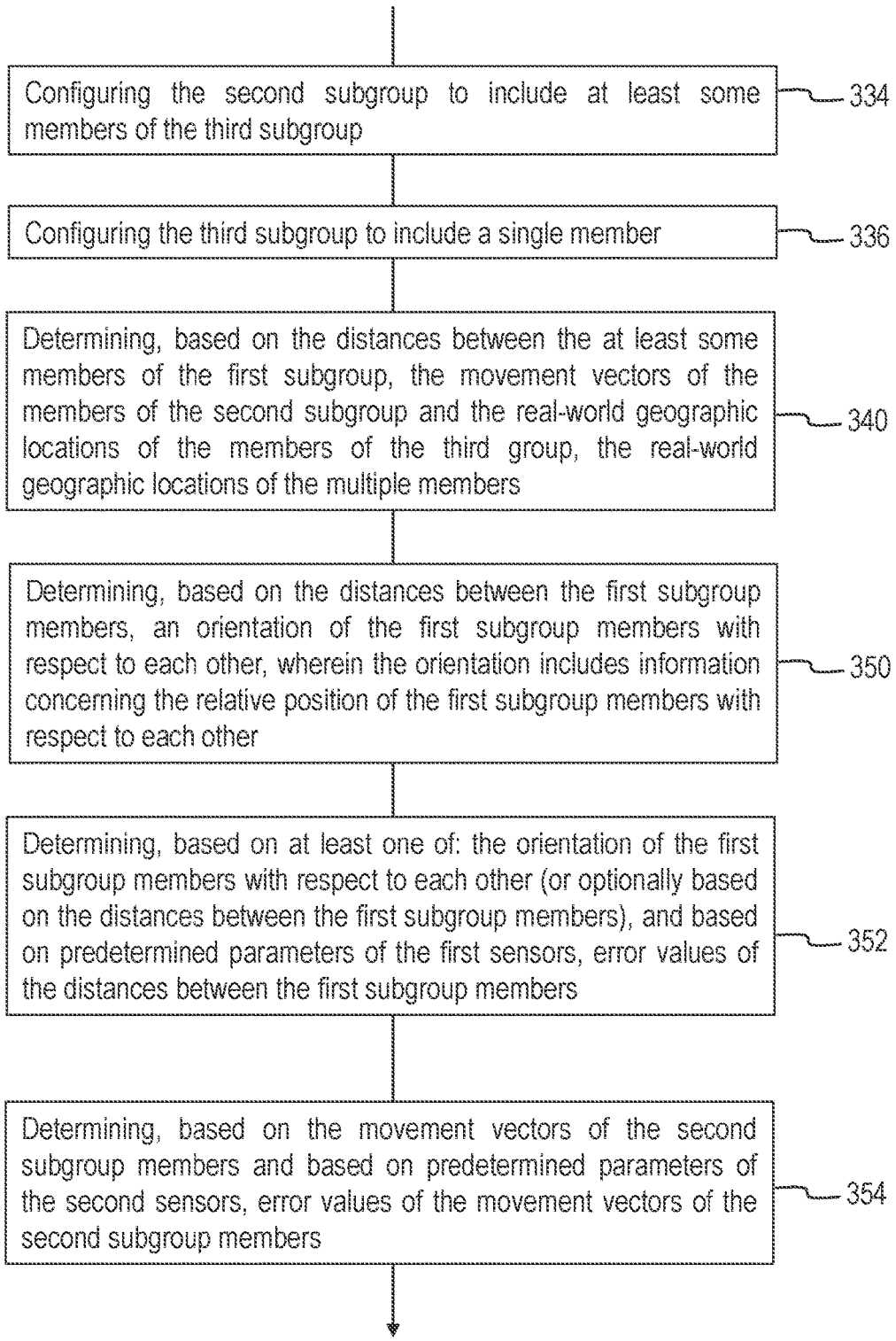
Figure 3 (cont. 1)

300

```
┌─────────────────────────────────────────────────────────────┐
│ Determining, based on the real-world geographic locations of the │
│ third subgroup members and based on predetermined parameters │──— 356
│ of the third sensors, error value(s) of the real-world geographic │
│ location(s) of the third subgroup members                    │
└─────────────────────────────────────────────────────────────┘
                              │
┌─────────────────────────────────────────────────────────────┐
│ Determining, based on the error values of the distances between │
│ the first subgroup members, error values of the movement vectors │
│ of the second subgroup members and based on the error values of │──— 358
│ the real-world geographic location of the third subgroup members, │
│ global error values of the real-world geographic locations of the │
│ multiple members                                             │
└─────────────────────────────────────────────────────────────┘
                              │
┌─────────────────────────────────────────────────────────────┐
│ Performing, for each of the multiple members, a predetermined │──— 360
│ number of communication cycles during a specified time period │
└─────────────────────────────────────────────────────────────┘
                              │
┌─────────────────────────────────────────────────────────────┐
│ Determining, at each of the predetermined communication cycles │
│ and for each of the multiple members, the respective member's │
│ real-world geographic location and further verifying that the │──— 362
│ respective member's global error value is below a predetermined │
│ error threshold                                              │
└─────────────────────────────────────────────────────────────┘
                              │
┌─────────────────────────────────────────────────────────────┐
│ performing, for each of the multiple members and within the same │
│ communication cycle, when the respective member's global error │
│ value is above the predetermined error threshold, another iteration │──— 364
│ to update the real-world geographic location of the respective │
│ member                                                       │
└─────────────────────────────────────────────────────────────┘
                              │
┌─────────────────────────────────────────────────────────────┐
│ Determining, for each of multiple members, when the respective │
│ member's global error value is above the predetermined error │
│ threshold, based on respective member's current real-world   │
│ geographic location and based on respective member's previous │──— 366
│ real-world geographic location, a respective member's        │
│ displacement vector, to yield corresponding displacement vectors │
│ of the multiple members                                      │
└─────────────────────────────────────────────────────────────┘
                              ↓
```

Figure 3 (cont. 2)

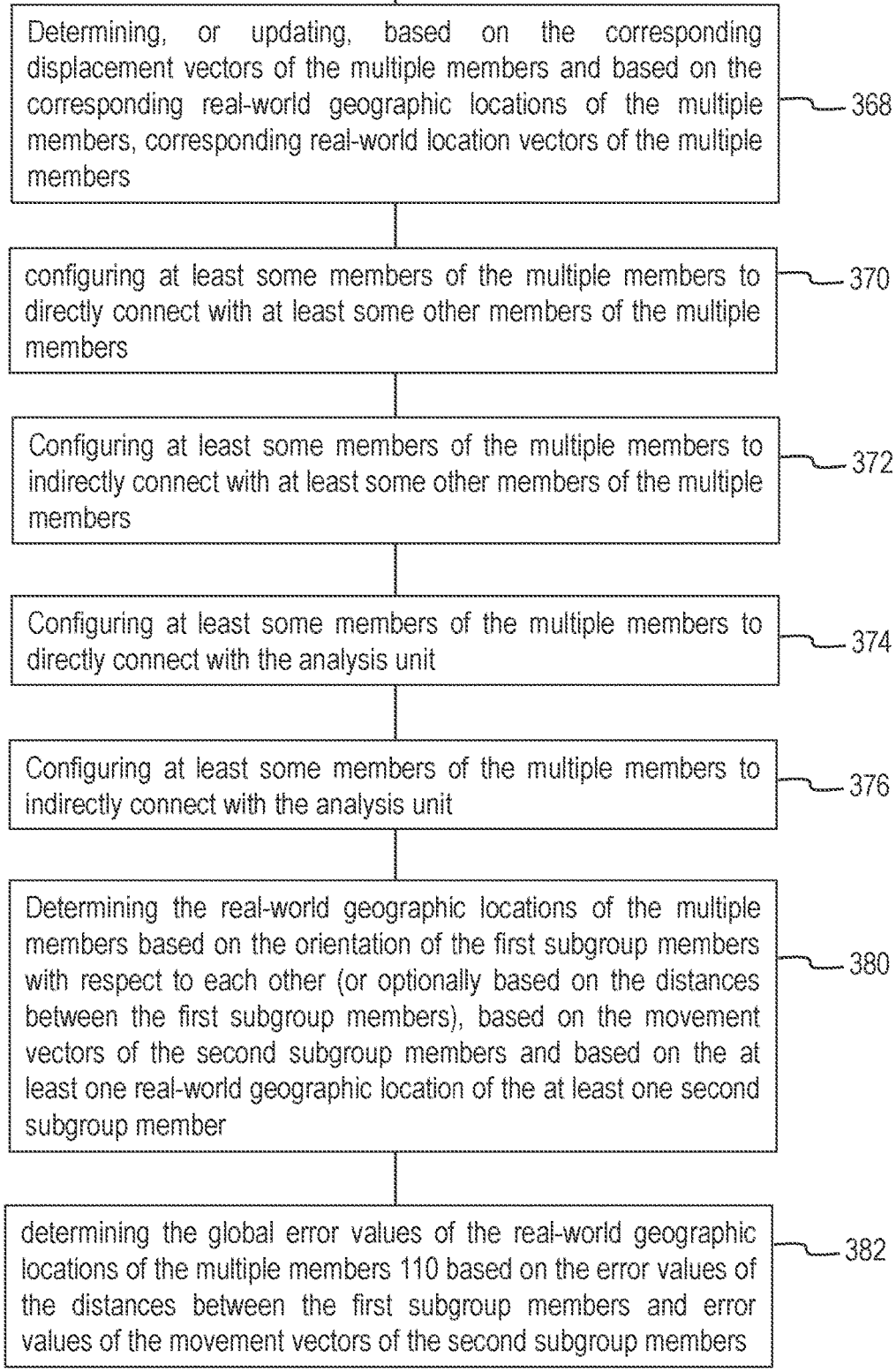
Figure 3 (cont. 3)

SYSTEM AND METHOD FOR DETERMINING REAL-WORLD GEOGRAPHIC LOCATIONS OF MULTIPLE MEMBERS

CROSS-REFERENCE TO RELATED APPLICATIONS

This application is a Continuation of WIPO Patent Application No. PCT/IL2019/050739 filed on Jul. 3, 2019 which claims priority from Israeli Patent Application No. 260406 filed on Jul. 3, 2018, both of which are incorporated herein by reference in their entireties.

FIELD OF THE INVENTION

The present invention relates to the field of geolocation, and more particularly, to determining real-world geographic locations of multiple members.

BACKGROUND OF THE INVENTION

Systems for determining real-world geographic locations of network members are widely used in civil and military applications. Some current systems utilize inertial sensors to determine real-world geographic locations of the network members. However, these systems require frequent and dedicated calibration and/or utilize high-cost sensors to provide robust results. Moreover, robust inertial sensors typically have large dimensions and are heavy, thereby limiting system's applications.

Other current systems utilize satellite-based communication sensors (e.g., GPS, etc.). However, these systems do not allow determining real-world geographic locations of the network members that are located in, for example, closed areas (such as buildings) and/or may be subjected to blockages and/or disruptions. Moreover, robust satellite-based communication sensors typically have large dimensions, are heavy and/or expensive, thereby limiting system's applications.

Other current systems utilize distance sensors to determine distances between the network members and predetermined, typically static, waypoints. However, these systems typically provide ambiguous information concerning the real-world geographic locations of the network members and may at best provide the relative position of the network members with respect to each other. Some current systems that utilize distance sensors may also combine inertial sensors to determine real-world geographic locations of the network members. However, robust inertial sensors typically have large dimensions and are heavy, thereby limiting system's applications (e.g., as described above).

Other current systems utilize optical systems to determine real-world geographic locations of network members. However, these systems require a direct line of sight with the network members and the application of these systems may be restricted due to, for example, weather conditions.

SUMMARY OF THE INVENTION

One aspect of the present invention provides a system for determining real-world geographic locations of multiple interconnected members, the system including: a first subgroup of the multiple members comprising first sensors, wherein the members of the first subgroup to determine, based on readings of the first sensors, distances between at least some members of the first subgroup; a second subgroup of the multiple members comprising second sensors, wherein the members of the second subgroup to determine, based on readings of the second sensors, movement vectors of the second subgroup members; a third subgroup of the multiple members which real-world geographic locations are known; and an analysis unit to: receive, from the members of the first subgroup, the distances between at least some members of the first subgroup, receive, from the members of the second subgroup, the movement vectors of the members of the second subgroup, receive, from the members of the third subgroup, the real-world geographic locations of the members of the third subgroup, and determine, based on the distances between the at least some members of the multiple members, the movement vectors of the members of the second subgroup and the real-world geographic locations of the members of the third group, the real-world geographic locations of the multiple members.

Another aspect of the present invention provides a method of determining real-world geographic locations of multiple interconnected members, the method including: determining distances between at least some members of a first subgroup of the multiple members; determining movement vectors of members of a second subgroup of the multiple members; determining real-world geographic locations of members of a third subgroup of the multiple members; and determining, based on the distances between the at least some members of the first subgroup, the movement vectors of the members of the second subgroup and the real-world geographic locations of the members of the third group, the real-world geographic locations of the multiple members.

These, additional, and/or other aspects and/or advantages of the present invention are set forth in the detailed description which follows; possibly inferable from the detailed description; and/or learnable by practice of the present invention.

BRIEF DESCRIPTION OF THE DRAWINGS

For a better understanding of embodiments of the invention and to show how the same can be carried into effect, reference will now be made, purely by way of example, to the accompanying drawings in which like numerals designate corresponding elements or sections throughout.

In the accompanying drawings.

Figure 1A:
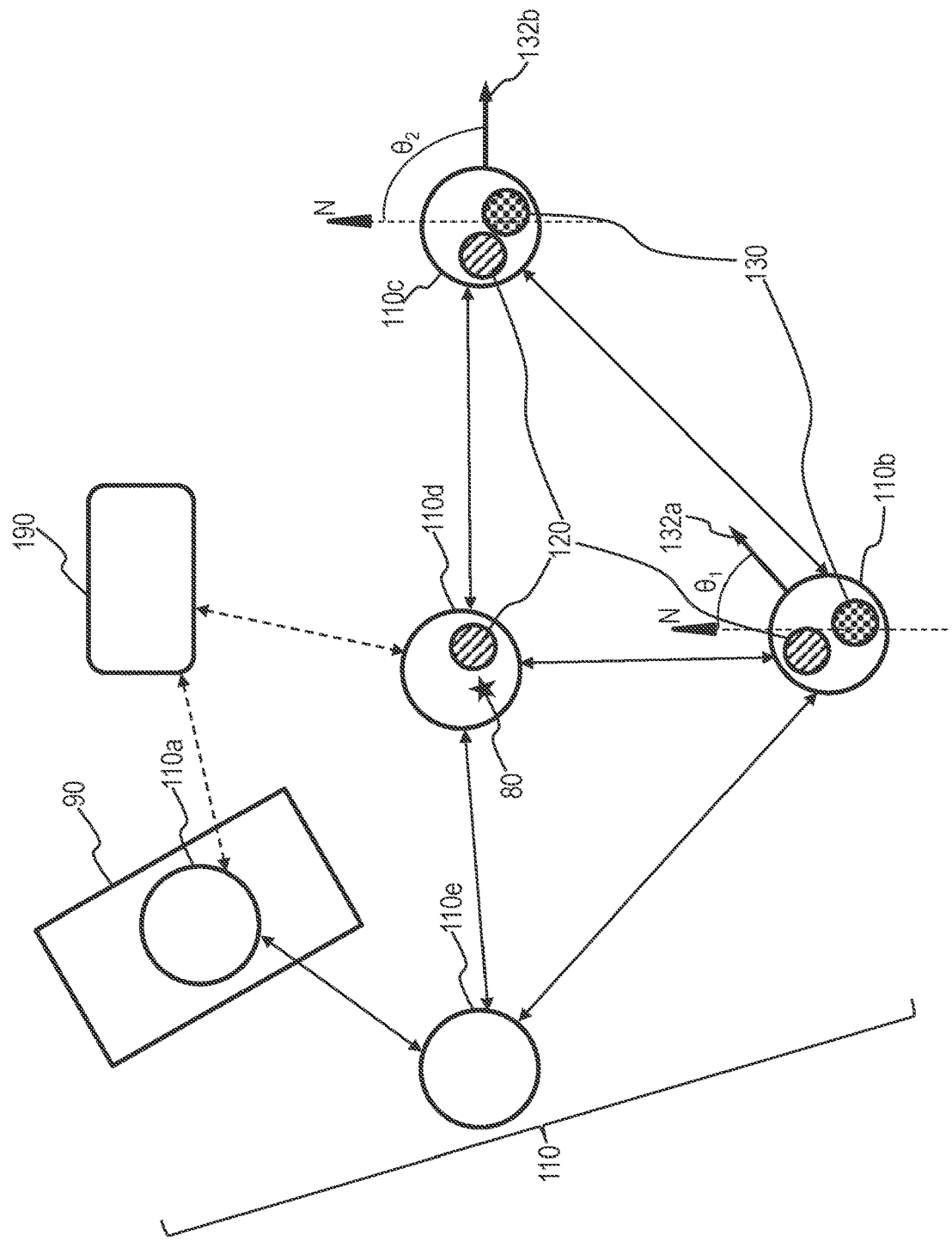
FIGS. 1A-1D are schematic illustration of various configurations of a system for determining real-world geographic locations of multiple members, according to some embodiments of the invention.

It will be appreciated that, for simplicity and clarity of illustration, elements shown in the figures have not necessarily been drawn to scale. For example, the dimensions of some of the elements may be exaggerated relative to other elements for clarity. Further, where considered appropriate, reference numerals may be repeated among the figures to indicate corresponding or analogous elements.

DETAILED DESCRIPTION OF THE INVENTION

In the following description, various aspects of the present invention are described. For purposes of explanation, specific configurations and details are set forth in order to provide a thorough understanding of the present invention. However, it will also be apparent to one skilled in the art that the present invention can be practiced without the specific details presented herein. Furthermore, well known features can have been omitted or simplified in order not to obscure the present invention. With specific reference to the drawings, it is stressed that the particulars shown are by way of example and for purposes of illustrative discussion of the present invention only and are presented in the cause of providing what is believed to be the most useful and readily understood description of the principles and conceptual aspects of the invention. In this regard, no attempt is made to show structural details of the invention in more detail than is necessary for a fundamental understanding of the invention, the description taken with the drawings making apparent to those skilled in the art how the several forms of the invention can be embodied in practice.

Before at least one embodiment of the invention is explained in detail, it is to be understood that the invention is not limited in its application to the details of construction and the arrangement of the components set forth in the following description or illustrated in the drawings. The invention is applicable to other embodiments that can be practiced or carried out in various ways as well as to combinations of the disclosed embodiments. Also, it is to be understood that the phraseology and terminology employed herein is for the purpose of description and should not be regarded as limiting.

Unless specifically stated otherwise, as apparent from the following discussions, it is appreciated that throughout the specification discussions utilizing terms such as "processing", "computing", "calculating", "determining", "enhancing" or the like, refer to the action and/or processes of a computer or computing system, or similar electronic computing device, that manipulates and/or transforms data represented as physical, such as electronic, quantities within the computing system's registers and/or memories into other data similarly represented as physical quantities within the computing system's memories, registers or other such information storage, transmission or display devices. Any of the disclosed modules or units can be at least partially implemented by a computer processor.

Generally, methods and systems for determining real-world geographic locations of multiple interconnected members are disclosed. The method may include: determining distances between at least some members of a first subgroup of the multiple members; determining movement vectors of members of a second subgroup of the multiple members; determining real-world geographic locations of members of a third subgroup of the multiple members; and determining, based on the distances between the at least some members of the first subgroup, the movement vectors of the members of the second subgroup and the real-world geographic locations of the members of the third group, the real-world geographic locations of the multiple members.

Reference is now made to FIGS. 1A-1D, which are schematic illustrations of various configurations of a system 100 for determining real-world geographic locations of multiple members 110, according to some embodiments of the invention.

System 100 may include multiple members 110 and an analysis unit 190. For example, system 100 may include a first member 110a, a second member 110b, a third member 110c, a fourth member 110d and/or a fifth member 110e (e.g., as shown in FIG. 1A). It is noted that system 100 may include any number of members (e.g., tens, hundreds and/or thousands of members).

Multiple members 110 may be interconnected (e.g., directly or indirectly) with each other. In some embodiments, at least some members of multiple members 110 are directly connected with some other members of multiple members 110 (e.g., as indicated by solid double arrows in FIGS. 1A-1D). For example, first member 110a may be directly connected with fifth member 110e and/or fourth member 110d may be directly connected with second member 110b, third member 110c and fifth member 110e (e.g., as shown in FIG. 1A).

In some embodiments, at least some members of multiple members 110 are indirectly connected with at least some other members of multiple members 110. For example, second member 110b may be indirectly connected with first member 110, e.g., via fifth member 110e (e.g., as shown in FIG. 1A).

In some embodiments, at least some members of multiple members 110 are directly connected with analysis unit 190 (e.g., as indicated by dashed double arrows in FIGS. 1A-1D). For example, first member 110a and/or fourth member 110d may be directly connected with analysis unit 190 (e.g., as shown in FIG. 1A).

In some embodiments, at least some members of multiple members 110 are indirectly connected with analysis unit 190. For example, third member 110c may be indirectly connected with analysis unit 190, e.g., via fourth member 110d and/or second member 110b may be indirectly connected with analysis unit 190, e.g., via fifth member 110e and first member 110a (e.g., as shown in FIG. 1A).

Figure 1B:
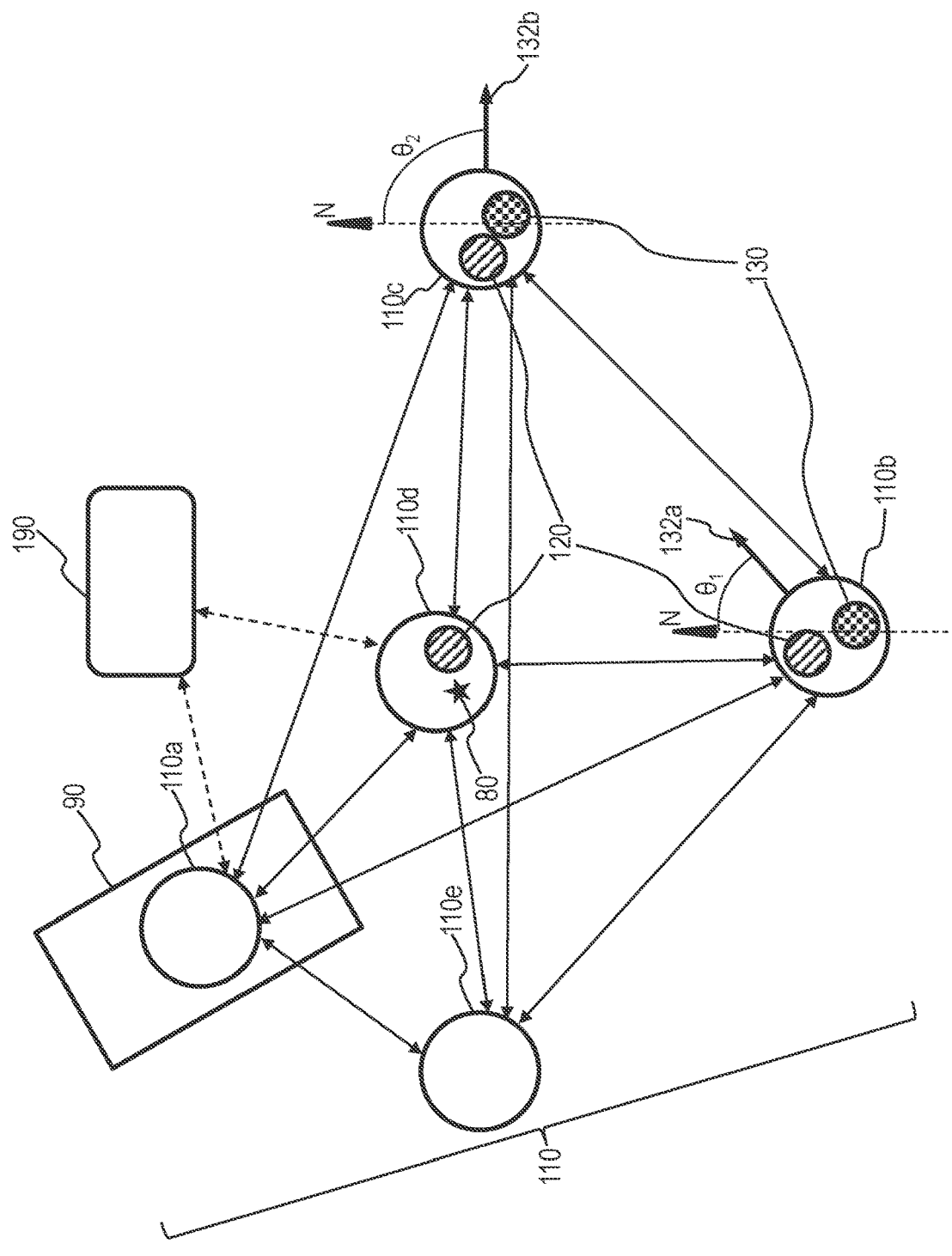
Figure 1C:
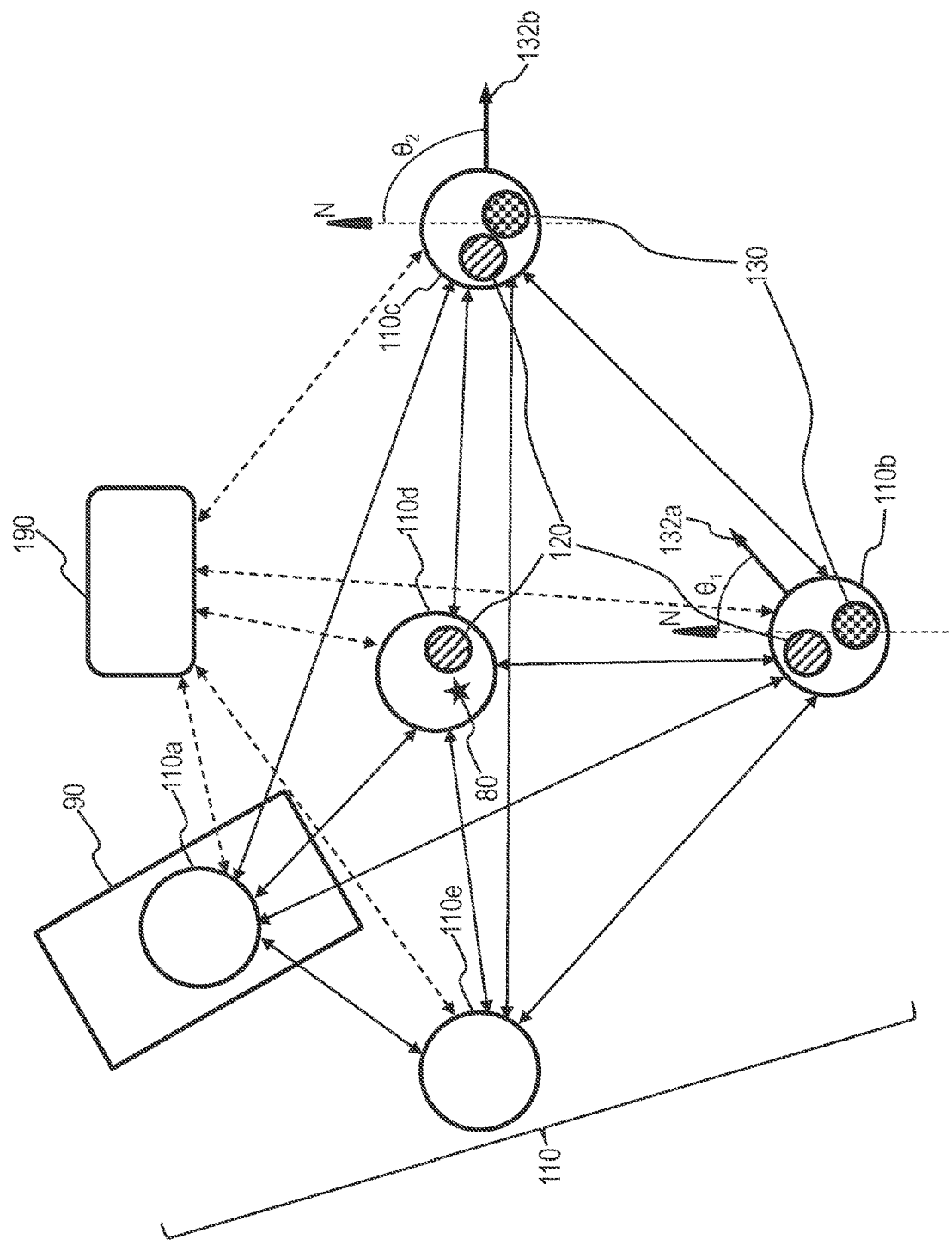

In some embodiments, each member of multiple members 110 is directly connected with all other members of multiple members 110 (e.g., as shown in FIG. 1B and FIG. 1C). In some embodiments, each member of multiple members 110 is directly connected with analysis unit 190 (e.g., as shown in FIG. 1C). In some embodiments, system 100 includes two or more analysis units 190 (now shown).

Multiple members 110 may be, for example, human subjects, cars, airborne vehicles, etc. In some embodiments, multiple members 110 may be at a specified site (e.g., a specified district of a city, a specified portion of an open terrain, etc.). In some embodiments, at least some members of multiple members 110 may move through the specified site in specified movement directions (e.g., as indicated by solid arrows in FIGS. 1A-1D). For example, second member 110b may move in a first direction (e.g., determined by angle $\theta_1$ with respect to the north cardinal direction which is indicated by "▲$^N$" in FIGS. 1A-1D) and/or third member 110c may move in a second direction (e.g., determined by angle $\theta 2$ with respect to the north cardinal direction), e.g., as shown in FIGS. 1A-1D. In some embodiments, at least some members of multiple members 110 may be in, for example, building(s) 90 (e.g., as shown in FIGS. 1A-1D).

System 100 may include a first subgroup of multiple members 110. For example, the first subgroup may include second member 110b, third member 110c and fourth member 110d. The members of the first subgroup (or at least some members of the first subgroup) may include first sensors 120 (e.g., as shown in FIGS. 1A-1D).

First sensors 120 may be distance sensors. The members of the first subgroup may determine, based on readings of first sensors 120, distances between at least some members of the first subgroup.

In some embodiments, each member of the first subgroup may determine, based on respective member's first sensor 120 readings, corresponding distances between the respective member and at least some other members of the first subgroup (e.g., as remaining members of the other members may be, for example, out of a detection range of the respective member's first sensor 120). For example, second member 110b may determine a distance between second member 110b and third member 110c, and a distance between second member 110b and fourth member 110d, respectively, based on the respective first sensors' 120 readings (e.g., as shown in FIG. 1A). Alternatively or complementarily, each member of the first subgroup may determine, based on the respective member's first sensor 120 readings, corresponding distances between the respective member and all other members of the first group.

In some embodiments, first sensors 120 are electromagnetic sensors. Each first sensor of first sensors 120 may, for example, transmit electromagnetic signals to at least some other first sensors of first sensors 120, receive return electromagnetic signals from the other first sensors, and further determine, based on the transmitted electromagnetic signals and the returned electromagnetic signals, corresponding distances between the respective first sensor and the at least some other first sensors thereof.

In some embodiments, the first subgroup includes all multiple members 110, wherein all multiple members 110 include first sensors 120 to determine distances between each two members of multiple members 110 (not shown).

System 100 may include a second subgroup of multiple members 110. In some embodiments, the first subgroup includes the members of the second subgroup. For example, the second subgroup may include second member 110b and third member 110c (e.g., as shown in FIGS. 1A-1D).

The members of the second subgroup may include second sensors 130. For example, each of second subgroup members may include a second sensor 130. Second sensors 130 may be inertial sensors. In some embodiments, each of second sensors 130 may include at least one of an accelerometer, a compass, a pedometer and/or an electromagnetic sensor.

In some embodiments, each member of the second subgroup may determine, based on respective member's second sensor 130 readings, a respective member's movement vector, to thereby yield movement vectors 132 of the second subgroup members. The movement vector of each member of the second subgroup may include a movement direction (e.g., determined with respect to, for example, the north cardinal direction) and a distance (e.g., number of steps) made by the respective member during a predetermined time duration. Second sensors 130 may be, for example, low-cost sensors that may provide stable and/or robust sensor data during the predetermined time duration ranging within several seconds only. In some embodiments, the predetermined time duration thereof ranges between 1-5 seconds.

For example, second member 110b may determine, based on second member's second sensor 130 readings, a first movement vector 132a of second member 110b that may include the first direction (e.g., determined by the angle $\theta_1$ with respect to the north cardinal direction) and a first distance made by second member 110b during the predetermined time duration (e.g., as shown in FIG. 1A). In another example, third member 110c may determine, based on third member's second sensor 130 readings, a second movement vector 132b of third member 110c that may include the second direction (e.g., determined by the angle $\theta_2$ with respect to the north cardinal direction) and a second distance made by third member 110c during the predetermined time duration (e.g., as shown in FIG. 1A).

In some embodiments, the second subgroup includes all members of the first subgroup, wherein each member of first subgroup includes second sensor 130 to determine the respective member's movement vector (not shown). In some embodiments, the second subgroup includes all multiple members 110, wherein each of multiple members 110 includes second sensor 130 to determine the respective member's movement vector (not shown).

System 100 may include a third subgroup of multiple members 110. In some embodiments, the first subgroup includes the third subgroup. In some embodiments, the second subgroup includes the third subgroup. In some embodiments, the third subgroup includes at least one member. For example, the third subgroup may include fourth member 110d.

Figure 1D:
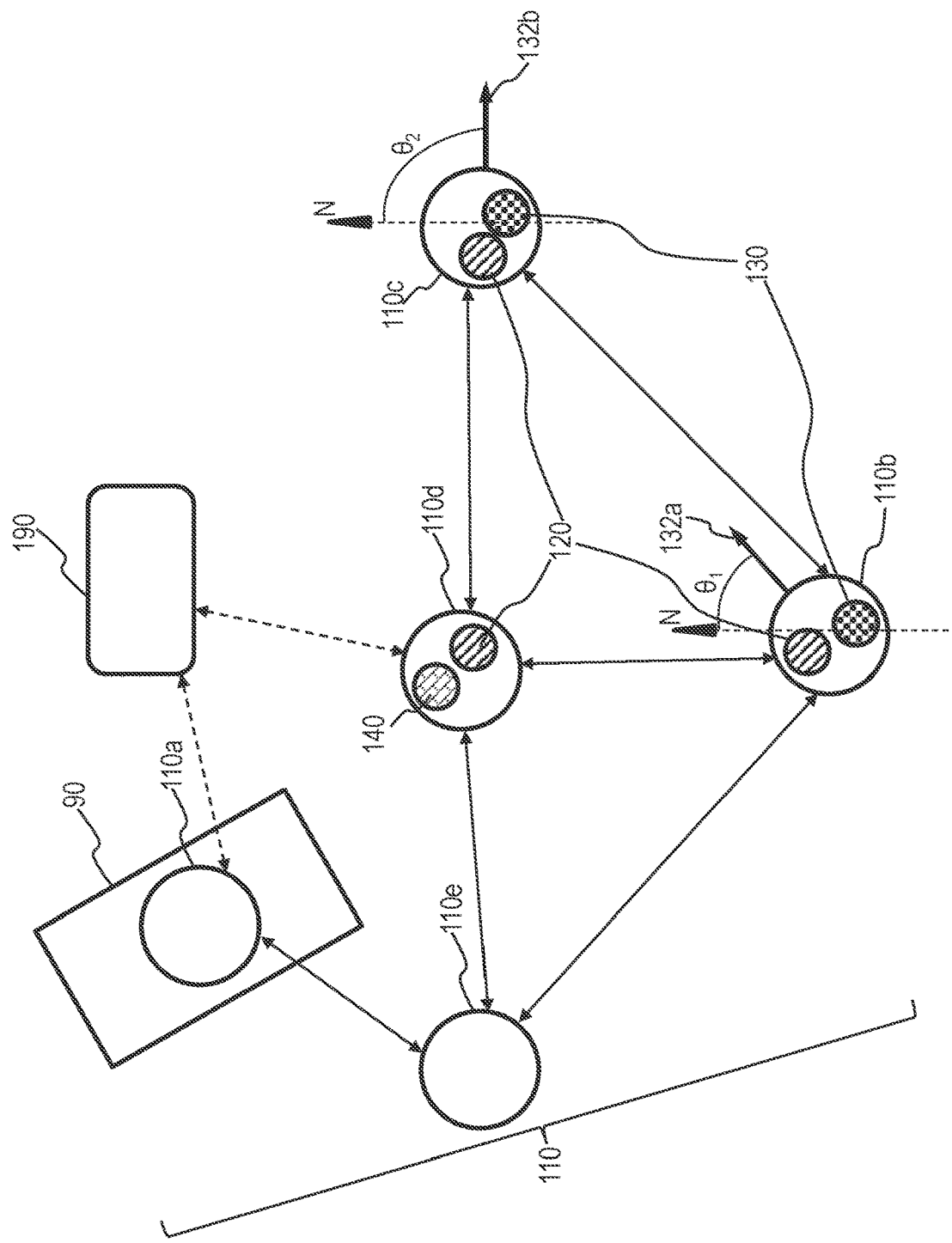

Real-world geographic location(s) of the third subgroup member(s) may be known and/or may be determined. In some embodiments, the member(s) of the third subgroup may be located at, or pass through, specified location(s) 80, which real-world geographic coordinates are known (e.g., as shown in FIGS. 1A-1C). In some embodiments, the member(s) of the third subgroup may include third sensor(s) 140 (e.g., as shown in FIG. 1D). Third sensor(s) 140 may be geolocation sensor(s), for example, GPS sensor(s). The member(s) of the third subgroup may determine, based on respective member(s) third sensor(s) 140 readings, real-world geographic location(s) of the member(s) of the third subgroup.

In some embodiments, system 100 may include a fourth subgroup of multiple members 110. The members of the fourth subgroup may not have any of first sensors 120, second sensors 130 and/or fourth sensors 140. For example, the fourth subgroup may include first member 110a and/or fifth member 110e (e.g., as shown in FIGS. 1A-1D). Each of the fourth subgroup members may be in any connection (e.g., visual, radio, etc.) with at least one of the first subgroup members, second subgroup members and/or third subgroup members such that at least one of: the distance of between the respective fourth group member and at least some members of the first subgroup, the movement vector of the respective fourth group member and/or the real-world geographic location of the respective fourth group member, respectively, may be determined or known, or at least estimated.

For example, fifth member 110e may follow, or accompany, second member 110b (e.g., a signaler and a commander in a battle field, respectively) such that a movement vector of fifth member 110e is similar (or substantially similar) to second movement vector 132b of second member 110b (e.g., determined based on second member's 110b second sensor 130 readings). In another example, fifth member 110e may follow, or accompany, fourth member 110d, such that a distance between fifth member 110e and at least some of the first subgroup members is similar (or substantially similar) to the distance between fourth member 110d and the at least some members thereof (e.g., as determined based on readings of first sensors 120).

The connections between the fourth subgroup members and other members of multiple members 110 may be predetermined, and information concerning the fourth subgroup connections may be stored in analysis unit 190. In various embodiments, the connections between the fourth subgroup members and other members of multiple members 110 thereof and/or the information concerning the connections thereof may be updated in real-time.

Analysis unit 190 may receive, from the members of the first subgroup, the distances between at least some members of the first subgroup.

Analysis unit 190 may further receive, from the members of the second subgroup, the movement vectors of the second subgroup members.

In some embodiments, analysis unit 190 may further determine updated distance(s) between at least some two members of the second subgroup, based on the respective members' movements vectors (that may include movement directions and movement distances of the respective members) and the distance(s) between the respective members. Advantageously, the updated distances thereof are more accurate as compared to, for example, the distances being determined by first sensors 120.

Analysis unit 190 may further receive, from the member(s) of the third subgroup, the real-world geographic location(s) of the member(s) of the third subgroup.

Figure 2A:
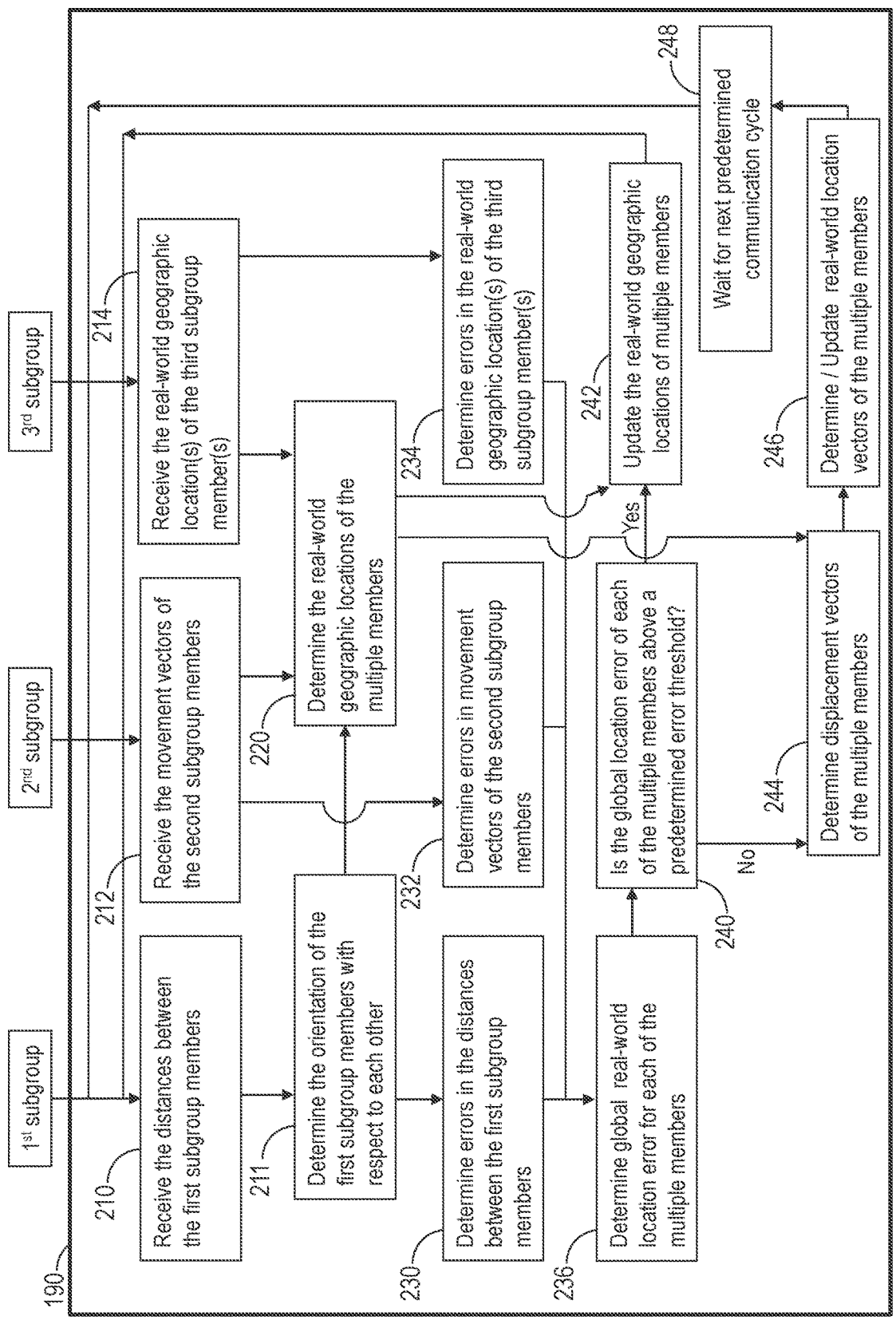
FIG. 2A and FIG. 2B are flowcharts of a method performed by an analysis unit of various configurations of a system for determining real-world geographic locations of multiple members, according to some embodiments of the invention.
Figure 2B:
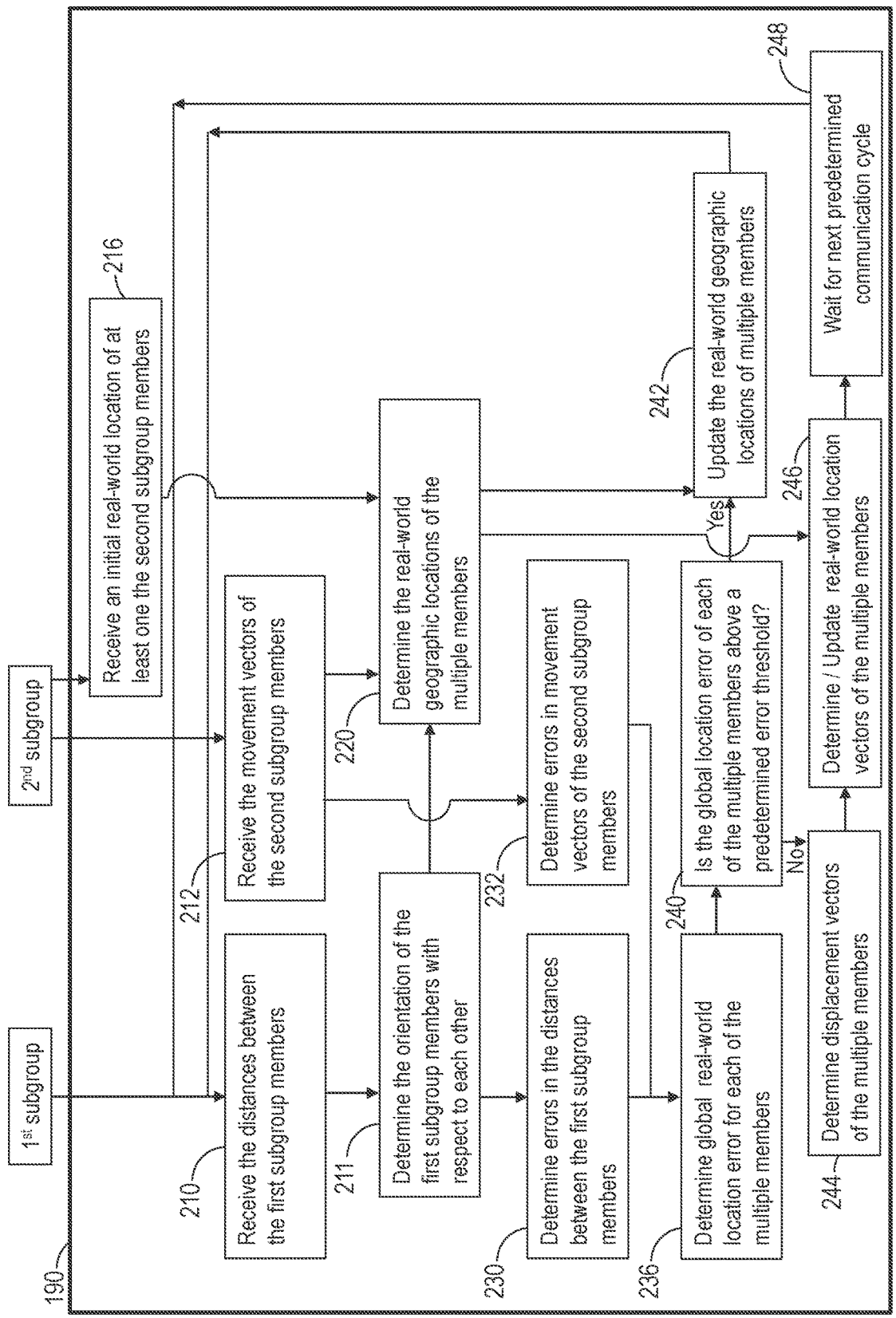

Analysis unit 190 may further determine, based on the distances between the at least some members of the first subgroup, the movement vectors of the second subgroup members, the real-world geographic location(s) of the third subgroup member(s), optionally based on the updated distance(s) between the at least some members of the second subgroup, and optionally based on the information concerning the connections between the fourth subgroup members and other members of multiple members 110, the real-world geographic locations of multiple members 110 (e.g., as described below with respect to FIG. 2A and FIG. 2B).

According to some embodiments, determination of the distances between at least some members of the first subgroup, the movement vectors of the second subgroup members and the real-world geographic location(s) of the member(s) of the third subgroup (wherein, in some embodiments, the first subgroup includes at least some members of the second subgroup and at least some members of the third subgroup) may be determined by analysis unit 190. For example, analysis unit 190 may receive readings from first sensors 120 of the first subgroup members, readings from second sensors 130 of the second subgroup members, and readings from third sensor(s) 140 of the third subgroup member(s), and further determine, based on the readings thereof, the distances between at least some members of the first subgroup, the movement vectors of the second subgroup members and the real-world geographic location(s) of the member(s) of the third subgroup, respectively.

System 100 may utilize low-end first sensors 120, low-end second sensors 130 and low-end third sensors 140. These low-end sensors may have relatively small dimensions, relatively small weight and/or relatively low-cost. Small dimensions and small weight of the low-end sensors 120, 130, 140 may, for example, enable human members (e.g., solders, policemen, firemen, etc.) to wear the sensors thereof (e.g., by embedding the sensors in, for example, members' uniform). The low-cost of the low-end sensors 120, 130, 140 may enable utilizing the sensors thereof in networks including multiple members (e.g., few, tens, hundreds and thousands of members), while reducing the total cost of system 100, as compared to current systems for determining real-world geographic location of the network members.

It is noted that low-end sensors that may be utilized by system 100 may provide stable and/or robust sensors' readings during a short time period only, typically of a few seconds. For example, movement vectors 132 of the second subgroup members (e.g., being determined based on the readings of second sensors 130) may include movement directions of the second subgroup members during the predetermined time duration of several seconds only (e.g., as described above with respect to FIGS. 1A-1D). As a result, such low-end sensors 120, 130, 140 cannot be used by system 100 as standalone sensors for determining the real-world geographic locations of the multiple members. It is a combination of the distances between the at least some members of the first subgroup, the movement vectors of the second subgroup members and the real-world geographic location(s) of the third subgroup member(s) that may enable system 100 (or analysis unit 190) to determine the real-world geographic locations of multiple members 110.

System 100 may be arranged to perform a predetermined number of communication cycles between each of multiple members 110 and analysis unit 190 during a specified time period (e.g., from beginning to end of a mission) (e.g., as described below with respect to FIG. 2A and FIG. 2B). Analysis unit 190 may be arranged to determine, at each of the predetermined communication cycles and for each of multiple members 110, the respective member's real-world geographic location (e.g., as described below with respect to FIG. 2A and FIG. 2B). Analysis unit 190 may save and store the real-world geographic locations of multiple members 110 being determined at each of the predetermined communication cycles.

During each of the communication cycles, analysis unit 190 may be arranged to determine, for each of multiple members 110, an error in the respective member's real-world geographic location, and verify that the error thereof is below a predetermined error threshold (e.g., as described below with respect to FIG. 2A and FIG. 2B). Analysis unit 190 may be arranged to perform multiple iterations, for each of multiple members 110 and during each of the communications cycles, to thereby reduce the error thereof below the predetermined error threshold (e.g., as described below with respect to FIG. 2A and FIG. 2B).

The number and/or the frequency of the communication cycles during the specified time period and/or the specified time period may be predetermined and/or updated in real-time based on the desired application of system 100.

Reference is now made to FIG. 2A and FIG. 2B, which are flowcharts of a method 200 performed by an analysis unit 190 of various configurations of a system 100 for determining real-world geographic locations of multiple members, according to some embodiments of the invention.

It is noted that method 200 is not limited to the flowcharts illustrated in FIG. 2A and FIG. 2B and to the corresponding description. For example, in various embodiments, method 200 needs not move through each illustrated box or stage, or in exactly the same order as illustrated and described.

Analysis unit 190 may receive, from the members of the first subgroup, the distances between at least some members of the first subgroup (stage 210). Analysis unit 190 may receive, from the second subgroup of members, the movement vectors of the second subgroup members (stage 212). Analysis unit 190 may receive, from the member(s) of the third subgroup, the real-world geographic location(s) of the member(s) of the third subgroup (stage 214) (e.g., as shown in FIG. 2A).

Analysis unit 190 may determine, based on the distances between the first subgroup members, an orientation of the first subgroup members with respect to each other (stage 211). The orientation thereof may, for example, include information concerning the relative position of the first subgroup members with respect to each other.

Analysis unit 190 may further determine, based on the orientation of the first subgroup members with respect to each other (or optionally based on the distances between the first subgroup members), based on the movement vectors of the second subgroup members and based on the real-world geographic location(s) of the member(s) of the third subgroup, the real-world geographic locations of multiple members 110 (stage 220).

Analysis unit 190 may determine, based on the orientation of the first subgroup members with respect to each other (or optionally based on the distances between the first subgroup members) and based on predetermined parameters of first sensors 120 (e.g., sensitivity of first sensors 120), error values of the distances between the first subgroup members (stage 230).

Analysis unit 190 may further determine, based on the movement vectors of the second subgroup members and based on predetermined parameters of second sensors 130 (e.g., sensitivity of second sensors 130), error values of the movement vectors thereof (stage 232).

Analysis unit 190 may further determine, based on the real-world geographic location(s) of the third subgroup member(s) and based on predetermined parameters of third sensor(s) 140 (e.g., sensitivity of third sensor(s) 140), error value(s) of the real-world geographic location thereof (stage 234).

Analysis unit 190 may further determine, based on the error values of the distances between the first subgroup members, error values of the movement vectors of the second subgroup members and based on error value(s) of the real-world geographic location of the third subgroup member(s), global error values of the real-world geographic locations of multiple members 110 (e.g., determined at stage 220) (stage 236).

Analysis unit 190 may determine, for each of multiple members 110, based on the respective member's global error value and a predetermined error threshold, whether the respective member's global error value is above or below the predetermined error threshold (stage 240). When the respective member's global error value is above the predetermined error threshold, analysis unit 190 may update the real-world geographic locations of multiple members 110 (stage 242) and further perform, within the same communication cycle, another iteration (e.g., that includes at least some of the following stages 210, 211, 212, 214, 220, 230, 232, 234, 236, 240, as described above with respect to FIG. 2A) to thereby update the real-world geographic location of the respective member.

When the global error value is below the predetermined error threshold, analysis unit 190 may determine, for each of multiple members 110, based on respective member's current real-world geographic location (e.g., determined during current communication cycle) and based on respective member's previous real-world geographic location (e.g., determined during previous communication cycle), a respective member's displacement vector, to yield corresponding displacement vectors of multiple members 110 (stage 244). Analysis unit 190 may determine, or update, based on the corresponding displacement vectors of multiple members 110 and based on the corresponding real-world geographic locations of multiple members 110, corresponding real-world location vectors of multiple members 110 (stage 246).

Analysis unit 190 may wait for next predetermined communication cycle (stage 248) and further determine, during the next predetermined communication cycle, updated real-world geographic locations, updated displacement vectors and/or updated real-world location vectors of corresponding multiple members 110 (e.g., as described above with respect to FIG. 2A).

In some embodiments, the real-world geographic location(s) of the third subgroup member(s) may not be available. For example, third sensor(s) 140 may be damaged and/or the third subgroup member(s) may not pass through specified location(s) 80 having known real-world location.

In this case, analysis unit 190 may receive at least one initial real-world geographic location of corresponding at least one second subgroup member (e.g., instead of the real-world geographic location(s) of the third subgroup member(s) that may be not available) (stage 216) (e.g., as shown in FIG. 2B).

The real-world geographic locations of multiple members 110 may be further determined (e.g., by analysis unit 190) based on the orientation of the first subgroup members with respect to each other (or optionally based on the distances between the first subgroup members), based on the movement vectors of the second subgroup members and based on the at least one real-world geographic location of the at least one second subgroup member (stage 220) (e.g., as shown in FIG. 2B). The global error values of the real-world geographic locations of multiple members 110 may be further determined (e.g., by analysis unit 190) based on the error values of the distances between the first subgroup members and error values of the movement vectors of the second subgroup members (stage 236) (e.g., as shown in FIG. 2B).

Figure 3:
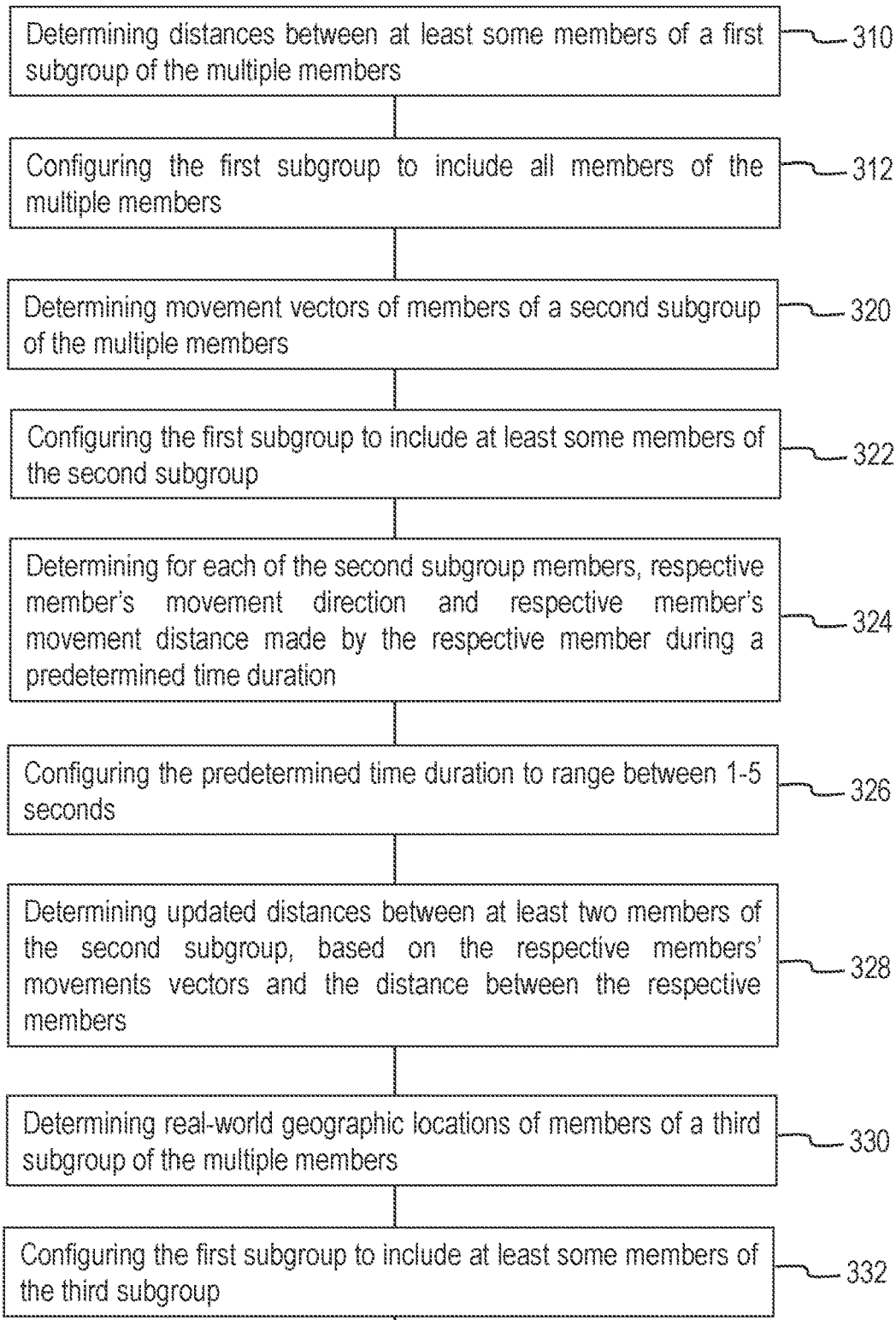
FIG. 3 is a flowchart of a method of determining real-world geographic locations of multiple members, according to some embodiments of the invention.

Reference is now made to FIG. 3, which is a flowchart of a method 300 of determining real-world geographic locations of multiple members, according to some embodiments of the invention.

Method 300 may be implemented by system 100 that may be arranged to implement method 300. It is noted that method 300 is not limited to the flowcharts illustrated in FIG. 3 and to the corresponding description. For example, in various embodiments, method 300 needs not move through each illustrated box or stage, or in exactly the same order as illustrated and described.

Method 300 may include determining distances between at least some members of a first subgroup of the multiple members (stage 310).

In some embodiments, method 300 may include configuring the first subgroup to include all members of the multiple members (stage 312).

Method 300 may include determining movement vectors of members of a second subgroup of the multiple members (stage 320).

In some embodiments, method 300 may include configuring the first subgroup to include at least some members of the second subgroup (stage 322).

In some embodiments, method 300 may include determining for each of the second subgroup members, respective member's movement direction and respective member's movement distance made by the respective member during a predetermined time duration (stage 324). In some embodiments, method 300 may include configuring the predetermined time duration to range between 1-5 seconds (stage 326).

In some embodiments, method 300 may include determining updated distances between at least two members of the second subgroup, based on the respective members' movements vectors and the distance between the respective members (stage 328).

Method 300 may include determining real-world geographic locations of members of a third subgroup of the multiple members (stage 330).

In some embodiments, method 300 may include configuring the first subgroup to include at least some members of the third subgroup (stage 332). In some embodiments, method 300 may include configuring the second subgroup to include at least some members of the third subgroup (stage 334). In some embodiments, method 300 may include configuring the third subgroup to include a single member (stage 336).

Method 300 may include determining, based on the distances between the at least some members of the first subgroup, the movement vectors of the members of the second subgroup and the real-world geographic locations of the members of the third group, the real-world geographic locations of the multiple members (stage 340).

In some embodiments, method 300 may include determining, based on the distances between the first subgroup members, an orientation of the first subgroup members with respect to each other, wherein the orientation includes information concerning the relative position of the first subgroup members with respect to each other (stage 350).

In some embodiments, method 300 may include determining, based on at least one of: the orientation of the first subgroup members with respect to each other (or optionally based on the distances between the first subgroup members), and based on predetermined parameters of the first sensors, error values of the distances between the first subgroup members (stage 352).

In some embodiments, method 300 may include determining, based on the movement vectors of the second subgroup members and based on predetermined parameters of the second sensors, error values of the movement vectors of the second subgroup members (stage 354).

In some embodiments, method 300 may include determining, based on the real-world geographic locations of the third subgroup members and based on predetermined parameters of the third sensors, error value(s) of the real-world geographic location(s) of the third subgroup members (stage 356).

In some embodiments, method 300 may include determining, based on the error values of the distances between the first subgroup members, error values of the movement vectors of the second subgroup members and based on the error values of the real-world geographic location(s) of the third subgroup members, global error values of the real-world geographic locations of the multiple members (358).

In some embodiments, method 300 may include performing, for each of the multiple members, a predetermined number of communication cycles during a specified time period (stage 360).

In some embodiments, method 300 may include determining, at each of the predetermined communication cycles and for each of the multiple members, the respective member's real-world geographic location and further verifying that the respective member's global error value is below a predetermined error threshold (stage 362).

In some embodiments, method 300 may include performing, for each of the multiple members and within the same communication cycle, when the respective member's global error value is above the predetermined error threshold, another iteration to update the real-world geographic location of the respective member (stage 364).

In some embodiments, method 300 may include determining, for each of multiple members, when the respective member's global error value is above the predetermined error threshold, based on respective member's current real-world geographic location and based on respective member's previous real-world geographic location, a respective member's displacement vector, to yield corresponding displacement vectors of the multiple members (stage 366).

In some embodiments, method 300 may include determining, or updating, based on the corresponding displacement vectors of the multiple members and based on the corresponding real-world geographic locations of the multiple members, corresponding real-world location vectors of the multiple members (stage 368).

In some embodiments, method 300 may include configuring at least some members of the multiple members to directly connect with at least some other members of the multiple members (stage 370). In some embodiments, method 300 may include configuring at least some members of the multiple members to indirectly connect with at least some other members of the multiple members (stage 372). In some embodiments, method 300 may include configuring at least some members of the multiple members to directly connect with the analysis unit (stage 374). In some embodiments, method 300 may include configuring at least some members of the multiple members to indirectly connect with the analysis unit (stage 376).

In some embodiments, the real-world geographic location(s) of the third subgroup member(s) may not be available. For example, the third sensor(s) of the third subgroup members may be damaged and/or the third subgroup member(s) may not pass through the specified location(s) 80 having known real-world location (e.g., as described above with respect to FIG. 2A and FIG. 2B).

In some embodiments, method 300 may include determining the real-world geographic locations of the multiple members based on the orientation of the first subgroup members with respect to each other (or optionally based on the distances between the first subgroup members), based on the movement vectors of the second subgroup members and based on the at least one real-world geographic location of the at least one second subgroup member (e.g., instead of the real-world geographic location(s) of the third subgroup member(s) that may be not available) (stage 380).

In some embodiments, method 300 may include determining the global error values of the real-world geographic locations of the multiple members 110 based on the error values of the distances between the first subgroup members and error values of the movement vectors of the second subgroup members (stage 382).

Advantageously, the disclosed systems and methods may allow to determine real-world geographic locations of multiple interconnected members based on distances between a first subgroup of the multiple members, based on movement vectors of at least some of the first subgroup members (e.g., wherein each of the movement vectors includes a movement direction and a movement distance made by a respective member during a predetermined time duration of few seconds), and based on a real-world geographic location of at least one of the first subgroup members.

Advantageously, the disclosed systems and methods may utilize low-end sensors for determining the distances, the movement vectors and/or real-world geographic locations of at least some of the first subgroup members. Such low-end sensors may have relatively small dimensions, relatively small weight and/or relatively low-cost. Accordingly, these sensors may be worn by human members (e.g., solders, policemen, firemen, etc.) and may be utilized in networks including multiple members (e.g., few, tens, hundreds and thousands of members), while keeping the total cost of the system relatively low. Advantageously, the disclosed systems and methods may combine the readings of the low-cost sensors thereof (e.g., that cannot be used as standalone sensors) to determine the real-world geographic locations of the multiple members while overcoming the disadvantages of current systems for determining real-world geographic locations of the network members. (e.g., as described above with respect to FIGS. 1A-1D, FIG. 2A, FIG. 2B and FIG. 3).

Aspects of the present invention are described above with reference to flowchart illustrations and/or portion diagrams of methods, apparatus (systems) and computer program products according to embodiments of the invention. It will be understood that each portion of the flowchart illustrations and/or portion diagrams, and combinations of portions in the flowchart illustrations and/or portion diagrams, can be implemented by computer program instructions. These computer program instructions can be provided to a processor of a general-purpose computer, special purpose computer, or other programmable data processing apparatus to produce a machine, such that the instructions, which execute via the processor of the computer or other programmable data processing apparatus, create means for implementing the functions/acts specified in the flowchart and/or portion diagram or portions thereof.

These computer program instructions can also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or portion diagram portion or portions thereof. The computer program instructions can also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or portion diagram portion or portions thereof.

The aforementioned flowchart and diagrams illustrate the architecture, functionality, and operation of possible implementations of systems, methods and computer program products according to various embodiments of the present invention. In this regard, each portion in the flowchart or portion diagrams can represent a module, segment, or portion of code, which includes one or more executable instructions for implementing the specified logical function(s). It should also be noted that, in some alternative implementations, the functions noted in the portion can occur out of the order noted in the figures. For example, two portions shown in succession can, in fact, be executed substantially concurrently, or the portions can sometimes be executed in the reverse order, depending upon the functionality involved. It will also be noted that each portion of the portion diagrams and/or flowchart illustration, and combinations of portions in the portion diagrams and/or flowchart illustration, can be implemented by special purpose hardware-based systems that perform the specified functions or acts, or combinations of special purpose hardware and computer instructions.

In the above description, an embodiment is an example or implementation of the invention. The various appearances of "one embodiment", "an embodiment", "certain embodiments" or "some embodiments" do not necessarily all refer to the same embodiments. Although various features of the invention can be described in the context of a single embodiment, the features can also be provided separately or in any suitable combination. Conversely, although the invention can be described herein in the context of separate embodiments for clarity, the invention can also be implemented in a single embodiment. Certain embodiments of the invention can include features from different embodiments disclosed above, and certain embodiments can incorporate elements from other embodiments disclosed above. The disclosure of elements of the invention in the context of a specific embodiment is not to be taken as limiting their use in the specific embodiment alone. Furthermore, it is to be understood that the invention can be carried out or practiced in various ways and that the invention can be implemented in certain embodiments other than the ones outlined in the description above.

The invention is not limited to those diagrams or to the corresponding descriptions. For example, flow need not move through each illustrated box or state, or in exactly the same order as illustrated and described. Meanings of technical and scientific terms used herein are to be commonly understood as by one of ordinary skill in the art to which the invention belongs, unless otherwise defined. While the invention has been described with respect to a limited number of embodiments, these should not be construed as limitations on the scope of the invention, but rather as exemplifications of some of the preferred embodiments. Other possible variations, modifications, and applications are also within the scope of the invention. Accordingly, the scope of the invention should not be limited by what has thus far been described, but by the appended claims and their legal equivalents.

The invention claimed is:

1. A system for determining real-world geographic locations of multiple interconnected members, the system comprising:
a first subgroup of the multiple members comprising first sensors, wherein the members of the first subgroup to determine, based on readings of the first sensors, distances between at least some members of the first subgroup;
a second subgroup of the multiple members comprising second sensors, wherein the members of the second subgroup to determine, based on readings of the second sensors, movement vectors of the second subgroup members, wherein each of the movement vectors comprises a movement direction and a movement distance made by the respective member during a predetermined time duration;
a third subgroup of the multiple members which real-world geographic locations are known;
wherein the first sub-group includes at least some of the members of the second sub-group and wherein at least one of the first sub-group and the second sub-group includes at least some of the members of the third sub-group;
wherein the first sensors are electromagnetic sensors, wherein each of the second sensors comprises at least one of an accelerometer, a compass, a pedometer, an electromagnetic sensor or any combination thereof; and
an analysis unit to:
receive, from the members of the first subgroup, the distances between at least some members of the first subgroup,
receive, from the members of the second subgroup, the movement vectors of the members of the second subgroup,
determine updated distances between at least two members of the second subgroup based on the movement vectors and the received distances of the respective at least two members, receive, from the members of the third subgroup, the real-world geographic locations of the members of the third subgroup, and determine, based on the distances between the at least some members of the first subgroup, the movement vectors of the members of the second subgroup, the updated distances between the at least two members of the second subgroup and the real-world geographic locations of the members of the third group, the real-world geographic locations of the members of the first sub-group and the second sub-group.

2. The system of claim 1, wherein the third subgroup includes a single member.

3. The system of claim 1, wherein the first subgroup includes all members of the multiple members.

4. The system of claim 1, wherein each of the third subgroup members comprises geolocation sensors and wherein each of the third subgroup members to determine, based on readings of the respective geolocation sensor, a real-world geographic location of the respective member, to yield corresponding real-world geographic locations of the third subgroup members.

5. The system of claim 1, wherein the predetermined time duration ranges between 1-5 seconds.

6. The system of claim 1, wherein the analysis unit further to determine, based on the distances between the first subgroup members, an orientation of the first subgroup members with respect to each other, wherein the orientation includes information concerning the relative position of the first subgroup members with respect to each other.

7. The system of claim 1, wherein the analysis unit is further to:
determine, based on at least one of: the orientation of the first subgroup members with respect to each other or based on the distances between the first subgroup members, and based on predetermined parameters of the first sensors, error values of the distances between the first subgroup members;
determine, based on the movement vectors of the second subgroup members and based on predetermined parameters of the second sensors, error values of the movement vectors of the second subgroup members;
determine, based on the real-world geographic locations of the third subgroup members and based on predetermined parameters of the third sensors, error value(s) of the real-world geographic location of the third subgroup members; and
determine, based on the error values of the distances between the first subgroup members, error values of the movement vectors of the second subgroup members and based on the error values of the real-world geographic location of the third subgroup members, global error values of the real-world geographic locations of the multiple members.

8. The system of claim 7, arranged to perform a predetermined number of communication cycles between each of the multiple members and the analysis unit during a specified time period, and wherein the analysis unit is arranged to determine, at each of the predetermined communication cycles and for each of the multiple members, the respective member's real-world geographic location and further verify that the respective member's global error value is below a predetermined error threshold.

9. The system of claim 1, wherein at least some members of the multiple members are directly connected with at least some other members of the multiple members.

10. The system of claim 1, wherein at least some members of the multiple members are indirectly connected with at least some other members of the multiple members.

11. The system of claim 1, wherein at least some members of the multiple members are directly connected with the analysis unit.

12. The system of claim 1, wherein at least some members of the multiple members are indirectly connected with the analysis unit.

13. A method of determining real-world geographic locations of multiple interconnected members, the method comprising:
providing:
a first subgroup of the multiple members, the members of the first subgroup comprising first sensors,
a second sub-group of the multiple member, the members of the second subgroup comprising second sensors, and
a third subgroup of the multiple members, the real-world geographical locations of the members of the third subgroup are known,
wherein the first sub-group includes at least some of the members of the second sub-group and wherein at least one of the first sub-group and the second sub-group includes at least some of the members of the third sub-group,
wherein the first sensors are electromagnetic sensors, wherein each of the second sensors comprises at least one of an accelerometer, a compass, a pedometer, an electromagnetic sensor or any combination thereof;
determining distances between at least some members of the first subgroup based on readings of the first sensors;
determining movement vectors of members of the second subgroup based on readings of the second sensors, wherein each of the movement vectors comprises a movement direction and a movement distance made by the respective member during a predetermined time duration;
determining updated distances between at least two members of the second subgroup based on the movement vectors and the received distances of the respective at least two members;
determining, based on the distances between the at least some members of the first subgroup, the movement vectors of the members of the second subgroup, the updated distances between the at least two members of the second subgroup and the real-world geographic locations of the members of the third group, the real-world geographic locations of the members of the first sub-group and the second sub-group.

14. The method of claim 13, further comprising configuring the third subgroup to include a single member.

15. The method of claim 13, further comprising configuring the first subgroup to include all members of the multiple members.

16. The method of claim 13, further comprising configuring the predetermined time duration to range between 1-5 seconds.

17. The method of claim 13, further comprising determining based on the distances between the first subgroup members, an orientation of the first subgroup members with respect to each other, wherein the orientation includes information concerning the relative position of the first subgroup members with respect to each other.

18. The method of claim 17, further comprising:
- determining, based on at least one of: the orientation of the first subgroup members with respect to each other or based on the distances between the first subgroup members, and based on predetermined parameters of the first sensors, error values of the distances between the first subgroup members;
- determining, based on the movement vectors of the second subgroup members and based on predetermined parameters of the second sensors, error values of the movement vectors of the second subgroup members;
- determining, based on the real-world geographic locations of the third subgroup members and based on predetermined parameters of the third sensors, error value(s) of the real-world geographic location of the third subgroup members; and
- determining, based on the error values of the distances between the first subgroup members, error values of the movement vectors of the second subgroup members and based on the error values of the real-world geographic location of the third subgroup members, global error values of the real-world geographic locations of the multiple members.

19. The method of claim 18, further comprising performing, for each of the multiple members, a predetermined number of communication cycles during a specified time period and determining, at each of the predetermined communication cycles and for each of the multiple members, the respective member's real-world geographic location and further verifying that the respective member's global error value is below a predetermined error threshold.

20. The method of claim 13, further comprising configuring at least some members of the multiple members to directly connect with at least some other members of the multiple members.

* * * * *